July 30, 1963 J. FOSSA 3,099,147
APPARATUS FOR PREPARING BASEBALL COVER PIECES FOR SEWING
Filed Nov. 5, 1959 10 Sheets-Sheet 1

Inventor
Joseph Fossa
By his Attorney

July 30, 1963 J. FOSSA 3,099,147
APPARATUS FOR PREPARING BASEBALL COVER PIECES FOR SEWING
Filed Nov. 5, 1959 10 Sheets-Sheet 2
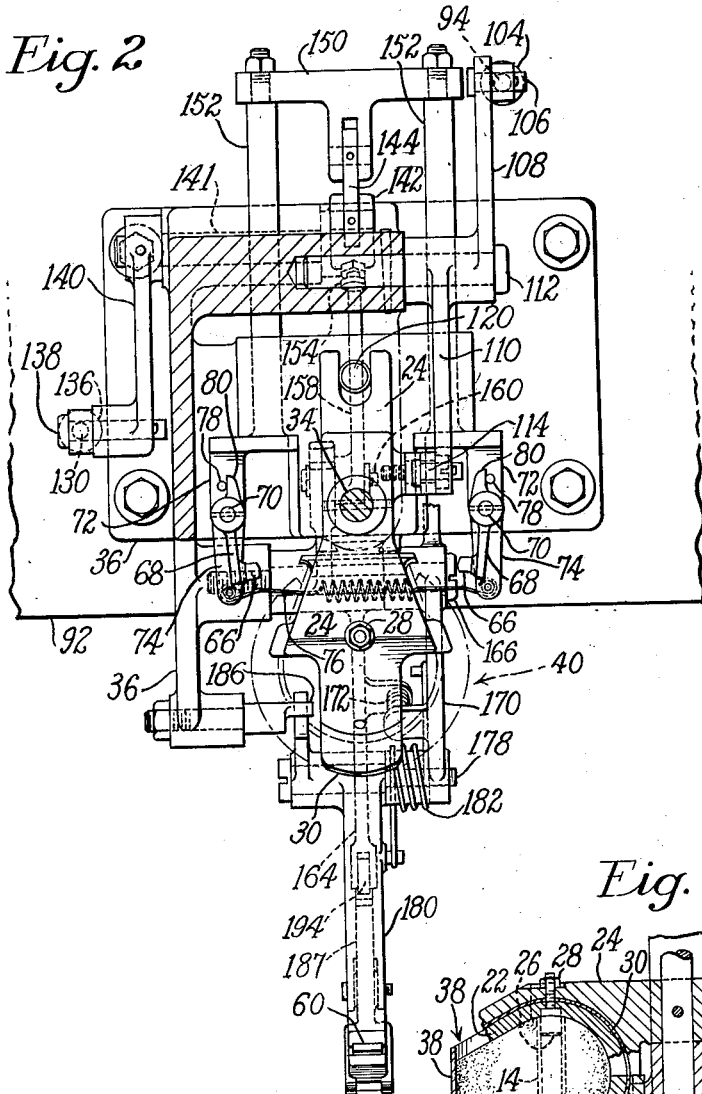
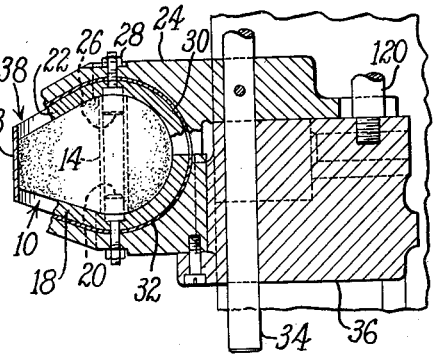
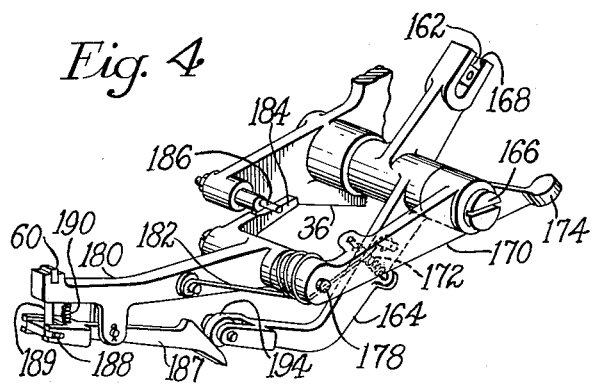

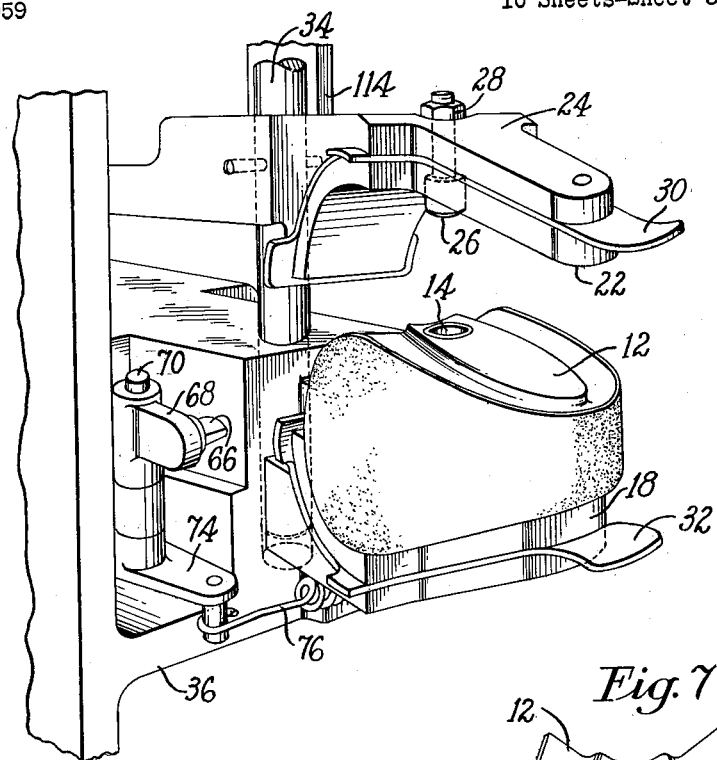
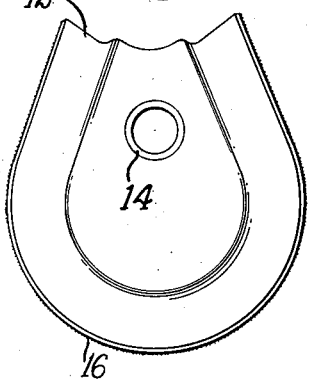
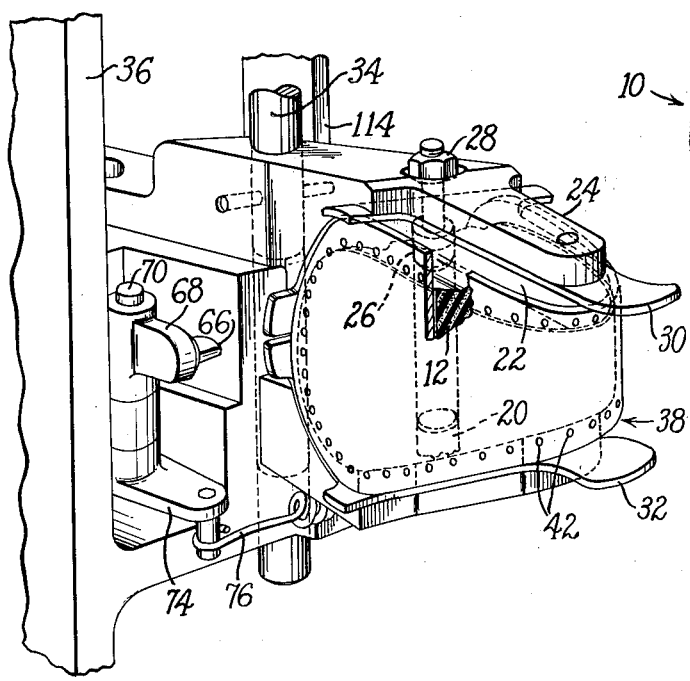

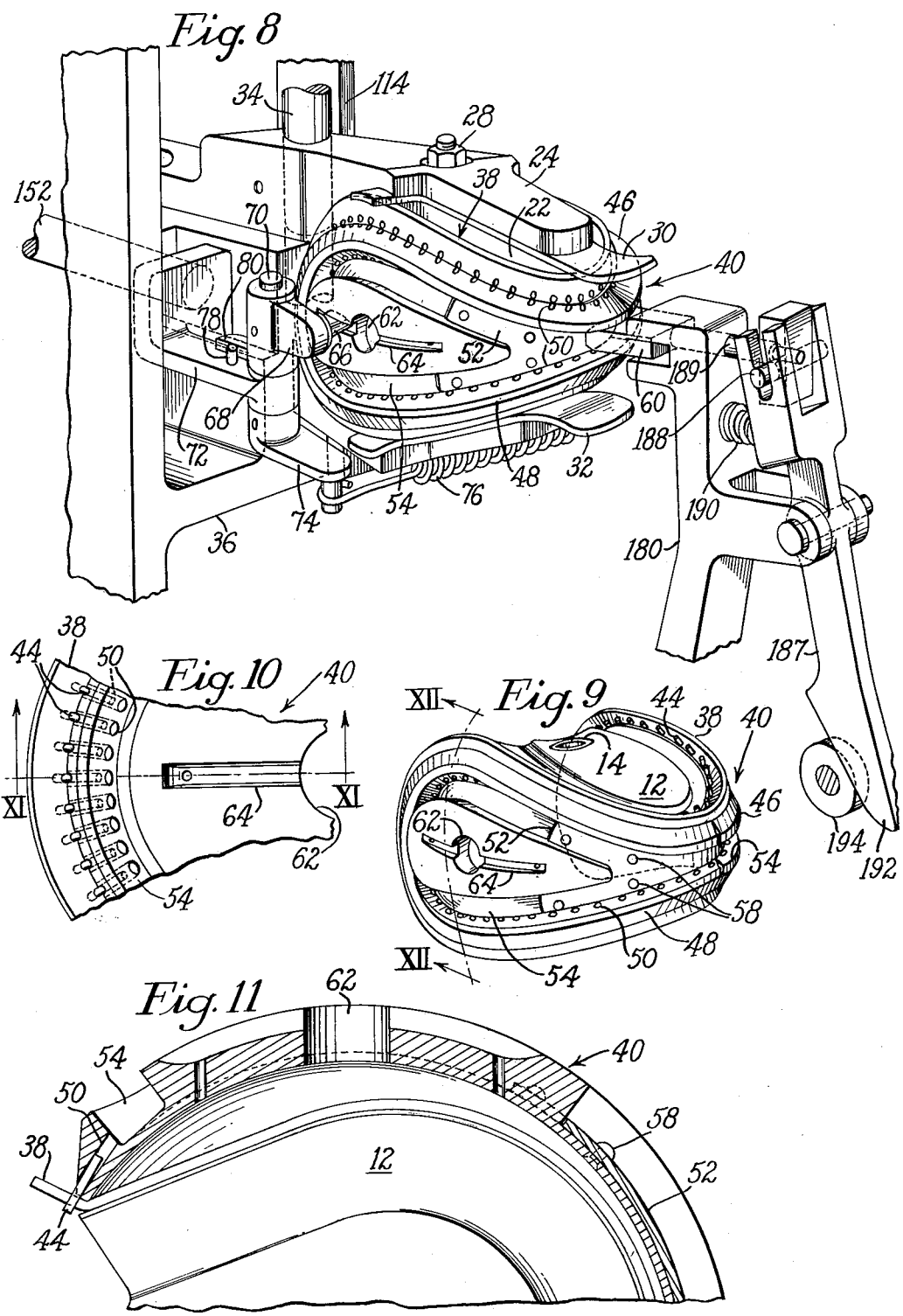

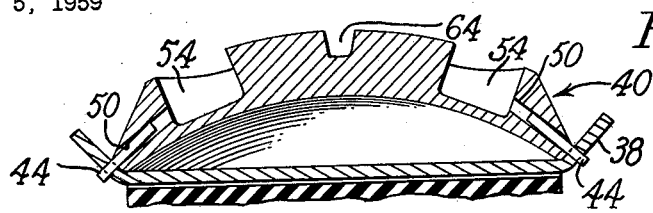
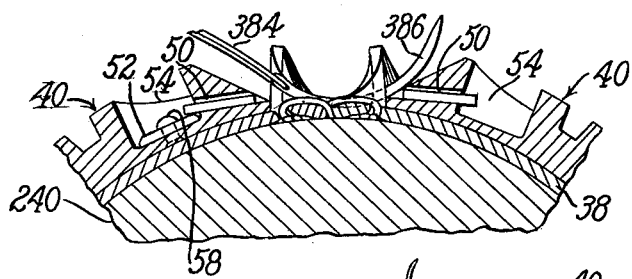
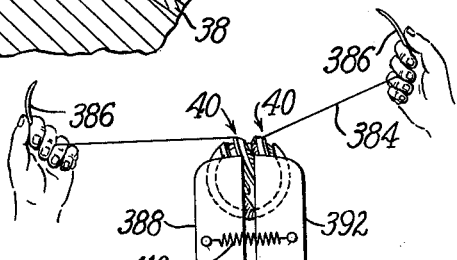
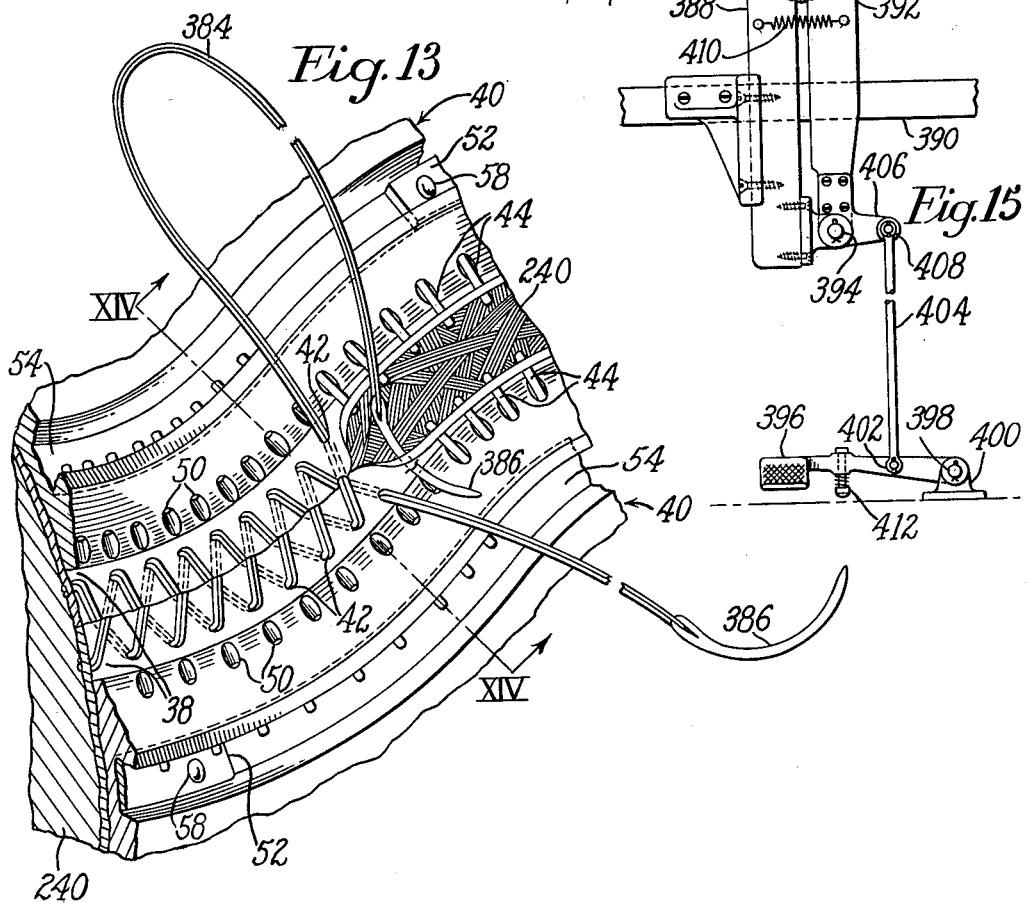

July 30, 1963  J. FOSSA  3,099,147
APPARATUS FOR PREPARING BASEBALL COVER PIECES FOR SEWING
Filed Nov. 5, 1959  10 Sheets-Sheet 6
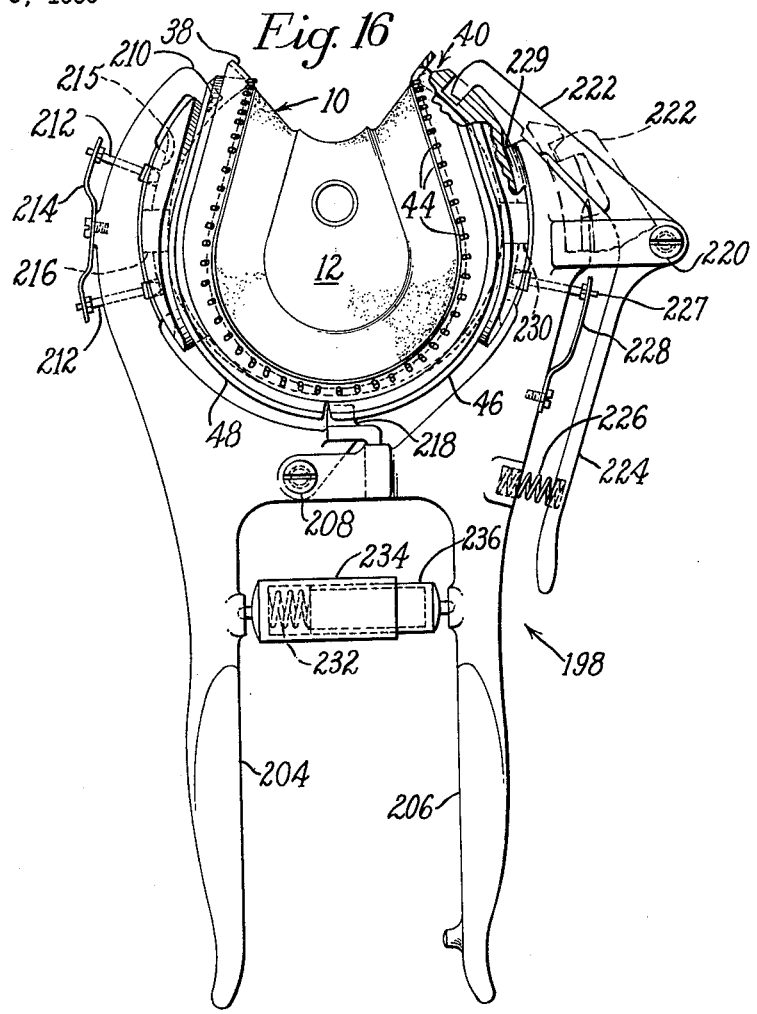
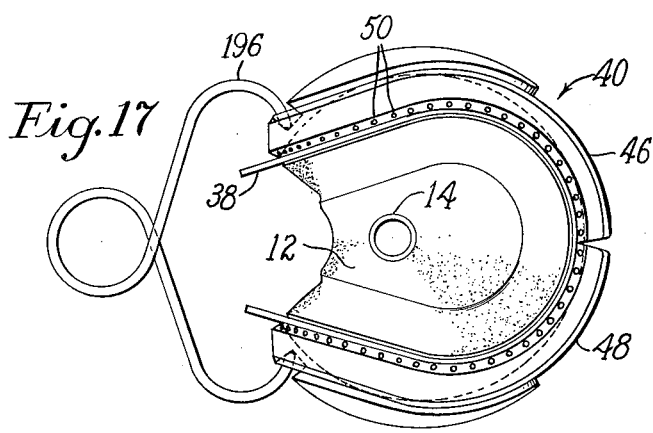

July 30, 1963  J. FOSSA  3,099,147
APPARATUS FOR PREPARING BASEBALL COVER PIECES FOR SEWING
Filed Nov. 5, 1959  10 Sheets-Sheet 7

July 30, 1963 J. FOSSA 3,099,147
APPARATUS FOR PREPARING BASEBALL COVER PIECES FOR SEWING
Filed Nov. 5, 1959 10 Sheets-Sheet 10
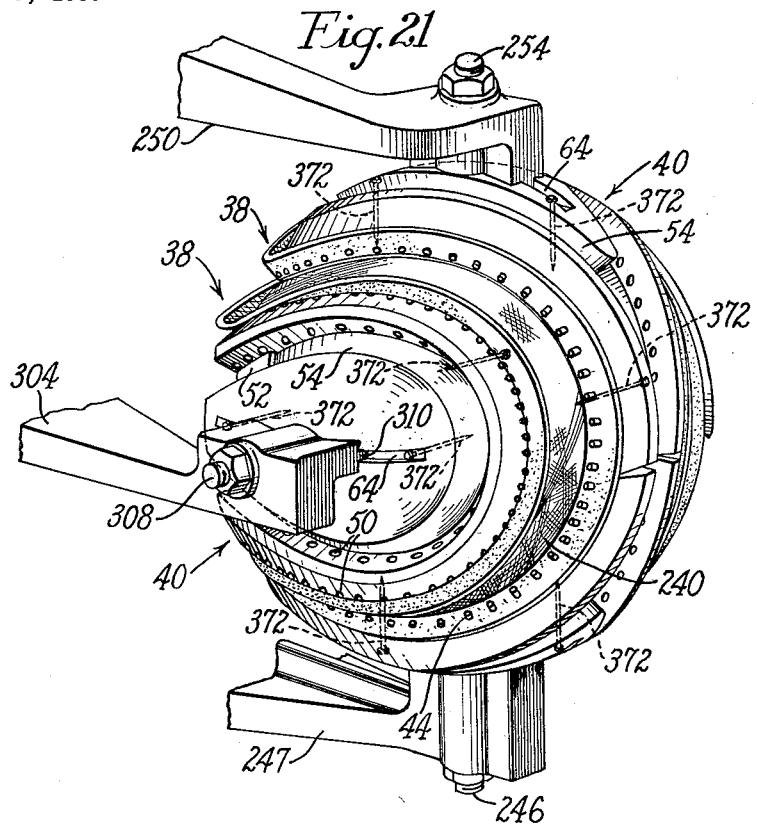
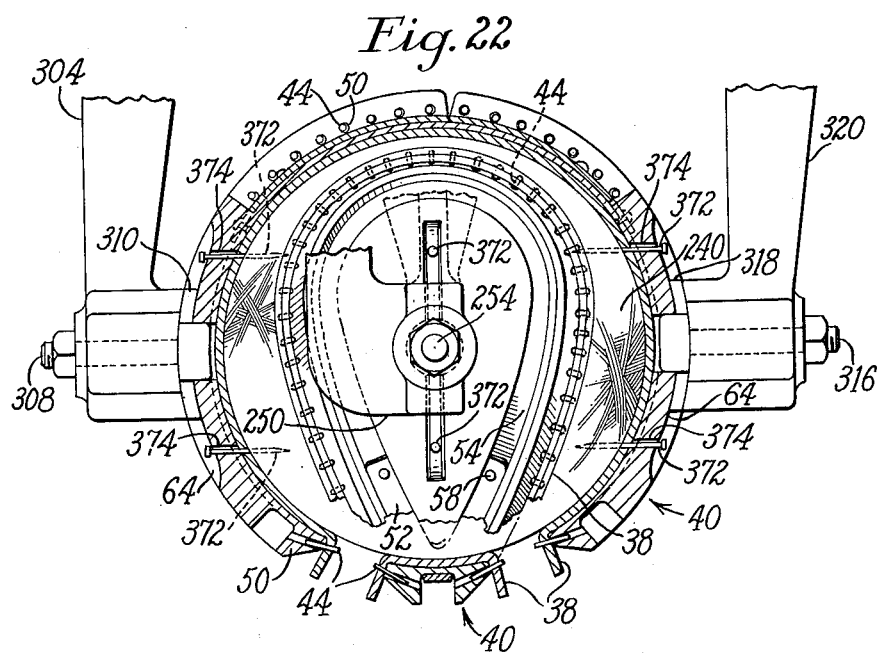

United States Patent Office 3,099,147
Patented July 30, 1963

3,099,147
APPARATUS FOR PREPARING BASEBALL
COVER PIECES FOR SEWING
Joseph Fossa, Hamilton, Mass., assignor to United Shoe Machinery Corporation, Boston, Mass., a corporation of New Jersey
Filed Nov. 5, 1959, Ser. No. 851,059
11 Claims. (Cl. 69—8)

This invention relates generally to the manufacture of balls, such as baseballs, and is more particularly directed to apparatus for preparing the bilobate cover pieces of such balls to receive a conventional baseball seam and for maintaining the cover pieces under control during the sewing operation so that the seam may be more efficiently inserted and without requiring extensive training and experience on the part of the operator. Certain inventions related to the present one and originally claimed in this application are now the subject matter of divisional applications for United States Letters Patent Serial Nos. 261,613, 261,633 and 262,300, filed February 28, 1963, in my name.

One of the most expensive and time consuming operations in the manufacture of a baseball, particularly one intended for Major League play, is the sewing of the cover. Conventionally, the operation consists of locating two bilobate cover pieces, which have previously been wetted or mulled, in seam receiving relationship over a baseball core. At the time of being placed about the core, the cover pieces do not conform to the core but are fastened thereto with the ends of one cover piece adjacent the edges at the waist of the other cover piece. Thereafter, a hand sewer inserts a pair of double threads through a portion of the core and progressively laces together the two cover pieces. As the insertion of the seam progresses the sewer applies a variable pull upon the threads to cause the cover piece to conform to the shape of the core and to bring the two cover pieces into abutment. Because the horsehide from which the cover pieces are cut and the pull exerted by the sewer are subject to wide variations which are difficult, if not impossible, to measure and which further are interrelated and interdependent, substantial variations in the quality and uniformity of the product must be tolerated. The alternative, and this is practiced to a certain degree, is the downgrading of baseballs to markets having less stringent requirements. The careful examination and qualitative grading are both time consuming and costly.

It is, accordingly, an object of the present invention to provide apparatus to achieve greater product uniformity than has heretofore been possible in the manufacture of baseballs. It is also an object to produce more uniform baseballs by operators having only such skill as can be obtained in a few days of training.

It is another object to separate completely, the conforming of the cover piece to the core from the insertion of the seam by which the cover pieces are joined together. It is yet another object, to accomplish the stretching of each cover piece instantaneously, in a single operation as opposed to the progressive stretching of the cover pieces as it is accomplished by means of the tension applied to the sewing thread.

In the achievement of the foregoing objects an important feature of the invention relates to a clamp employed for maintaining control over each cover piece and for facilitating the relative positioning of the two cover pieces over the core prior to the insertion of the seam. Briefly, the clamp consists of two hinged members together having a spherical internal surface and a bilobate contour similar to that of the cover piece but of smaller dimensions so that when the clamp and cover piece are placed with their longitudinal and transverse center lines in register, a generally uniform margin of the cover piece is exposed outside the contour of the clamp. Each cover piece is connected to the edge of a clamp which has a series of openings positioned to coincide with the thread receiving perforations in the margin of the cover piece, by a series of pins, one pin engaging each cover perforation and the corresponding opening in the clamp.

According to another feature of the invention, a supporting form is employed to receive the cover piece in unstretched or passive condition in a convenient position to be engaged by the clamp preparatory to the insertion of the pins. The supporting form has a work engaging surface similar in outline to the cover piece but, like the clamp, is smaller than the cover piece to permit a generally uniform margin of the cover piece to extend beyond the form. In the area of its waist the form is generally cylindrical and the end lobes are flattened so that the cover piece is initially sandwiched between the form and the clamp without being stretched. The supporting form is preferably sheathed with a coating of abrasive particles to prevent relative slipping between it and the cover, particularly when a slight pressure is exerted upon the clamp. In this condition, the pins are inserted through the thread receiving perforations in the cover piece and into the openings in the edge of the clamp.

A pair of cover pieces, each under the control of a clamp, are placed about a baseball core, and by applying pressure to the clamps, the cover pieces are stretched to conform to the spherical surface of the core. The two cover pieces are also relatively positioned on the core so that the threads which are employed to insert a conventional baseball seam do nothing more than bring the edges of the cover pieces into abutting relationship without, in any way, stretching either cover piece.

Another feature of the invention relates to a machine for relatively positioning the supporting form, cover and clamp preparatory to the insertion of the pins prior to employing a cover stretching machine for relatively orienting and stretching two clamp-supported cover pieces on a baseball core.

By employing the present apparatus it is possible to realize a method of inserting the seam in order to achieve greater control over the position of the line of abutment between the cover pieces than has heretofore been possible. The cover pieces are maintained under the control of a clamp up to the point of needle operation, the margin of each piece being progressively released from the control of the retaining pins at the time that the thread is passed through the cover perforations.

The foregoing objects and advantages of the present invention are attained by the exemplary apparatus embodying the features already mentioned, to be described in connection with the accompanying drawings in which;

FIG. 2 is a section on the line II—II of FIG. 1;

FIG. 3 is a fragmentary view in cross section showing a baseball cover piece and underlying form, and means included in the assembly machine of the preceding figures for supporting the form;

FIG. 4 is a fragmentary detail view illustrating a portion of a mechanism in the assembly machine for pressing a clamp into encompassing relation with the form-supported cover piece;

FIG. 5 is a fragmentary detail view showing in perspective the cover piece supporting form being received in the assembly machine;

FIG. 6 is a view similar to that of FIG. 5 but showing the cover piece having been already placed about the supporting form;

FIG. 7 is a detail view of the cover supporting form;

FIG. 8 is a view similar to FIGS. 5 and 6 but showing in addition a bilobate clamp according to a feature of the invention in position over the cover piece;

FIG. 9 is a detail view showing a cover piece supported upon the form of FIG. 7 and retained in the clamp;

FIG. 10 is a fragmentary view on an enlarged scale showing a portion of a lobe of the clamp illustrated in FIG. 9;

FIG. 11 is a fragmentary view in cross section taken along the line XI—XI of FIG. 10, showing the relative positions of the form, cover piece, and clamp;

FIG. 12 is a fragmentary view in cross section taken along the line XII—XII of FIG. 9, showing the cover piece bridging a concave portion of the clamp;

FIG. 13 is a fragmentary view of two cover pieces and fragments of clamps about a baseball core while the cover pieces are being united by a conventional baseball seam inserted in a novel manner by employing a pair of clamps according to the present invention;

FIG. 14 is a view in cross section taken along the line XIV—XIV of FIG. 13;

FIG. 15 is a view on a reduced scale showing a vise useful for conveniently supporting the parts shown in FIG. 13, while the seam is being inserted;

FIG. 16 is a detail view showing a cover piece and a portion of the apparatus illustrated in FIG. 9 together with a hand tool useful for removing the form from within the cover and for applying the cover piece to a baseball core;

FIG. 17 is a detail view of a portion of the apparatus of FIG. 9 and additionally illustrating a spring device for holding the clamp in engagement with the cover piece until the cover piece can be temporarily secured to the clamp;

FIG. 21 is a fragmentary view on an enlarged scale showing a pair of complementary cover pieces each retained by a clamp and positioned about a baseball core by the machine more fully illustrated in FIGS. 18 to 20 inclusive, and FIG. 22 is a fragmentary plan view partially in cross section showing the component parts of a baseball and the apparatus also depicted in FIG. 21.

Figure 1:
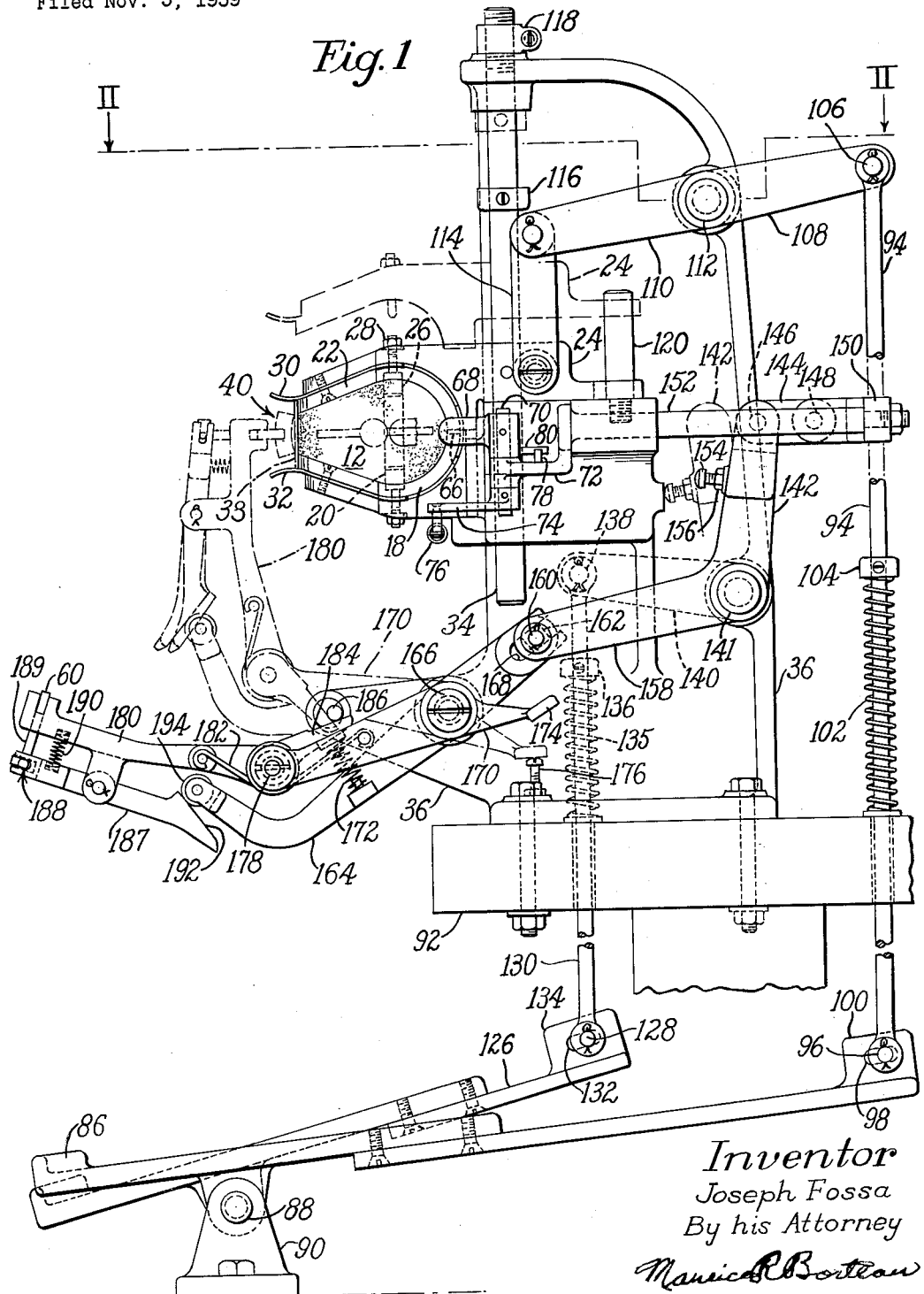
FIG. 1 is a view in right side elevation of a cover and clamp assembly machine according to the present invention.

The machine illustrated in FIG. 1 is employed for locating a cover piece about a supporting form, shown in FIG. 7, as a first step in operating upon the cover piece. Thereafter a clamp, shown in FIGS. 8 and 9, is introduced about the cover piece in predetermined relative position leaving a generally uniform margin of the cover piece exposed outside the periphery of the clamp. The supporting form, cover piece and clamp are removed from the machine of FIG. 1 and held temporarily by a spring device such as that shown in FIG. 17 while a series of pins, shown in FIGS. 9 and 11, are inserted through the cover piece and into the clamp, to secure the entire margin of the cover piece to the clamp. After this has been accomplished a plier-like tool, shown in FIG. 16, is employed for first spreading the clamp slightly so that the supporting form may be removed from within the cover piece and thereafter further opening the clamp so that the cover piece may be positioned about a baseball core in a second machine such as that illustrated in FIG. 18. A second cover piece is handled in the same manner as has been described for the first one and is similarly introduced about the baseball core, the machine of FIG. 18 being provided with devices for relatively orienting the two cover pieces about the baseball core.

Because the margins of the two cover pieces are closely controlled by the clamps there is no wrinkling of the leather as each of the clamps is closed about the core causing the cover piece to stretch both longitudinally and transversely to conform to the spherical shape of the core. After the two cover pieces have been stretched in correct relative positions about the core and while they are still under the control of the clamps in the machine of FIG. 18, temporary fasteners in the form of brads, shown in FIGS. 21 and 22, are inserted through the clamps and the cover pieces and into the core so that the clamps will not be displaced when the assembly is removed from the second machine. Thereafter the assembly of the baseball core, two cover pieces and two clamps, is held in a vise such as that shown in FIG. 15 and a conventional baseball seam is inserted to secure the two cover pieces in abutting relationship. Although the seam is of a conventional type there is an important variation introduced in its formation in that the cover pieces are progressively released from the control of the clamps by disengaging the cover pieces from the pins as the seam is being inserted.

It will be seen from the above summary that in sewing baseball covers with the assistance of the present apparatus the thread has but a single function that of holding the cover pieces in abutting relation in the finished ball. The stresses of conforming the cover pieces over the core are evenly distributed over the entire margin of each cover piece thereby assuring a far greater degree of uniformity than has heretofore been possible.

Referring particularly to FIGS. 5 to 7, the form indicated at 10 is provided according to a feature of the invention to support the cover piece. The form 10 consists of a body portion 12 of a resilient rubber material in which is embedded an orienting tube 14. To minimize slippage of the cover piece when it is later introduced about the form 10, a sheathing of abrasive cloth indicated at 16 is provided.

In the cover and clamp assembly machine, the form 10 is received upon a base 18 where it is oriented upon a stationary locating stud 20 upstanding from the base and so located that the form is nested upon the upper surface of the base. For engaging the upper surface of the form 10 a movable member is provided and includes a nesting plate 22 having a form-contacting surface similar to that of the base 18. The plate 22 is secured on a movable carrier 24 and is perforated to receive the reduced diameter of a locating stud 26 which is secured by a nut 28 to the arm coaxially with the stud 20. The carrier 24 also supports a locating member 30 interposed between the plate 22 and the arm, a similar member 32 being provided on the base 18. The carrier 24 is fixedly supported upon a slide bar 34 which is vertically movable in the frame indicated at 36. In FIG. 5 the carrier 24 is shown in position to receive the form 10. In FIG. 6 the carrier 24 has been lowered to engage the form 10 and a cover piece indicated at 38 has been wrapped about the form, its edge in contact with the locating members 30 and 32, which together provide both widthwise and lengthwise positioning of the cover piece on the form. As in conventional covering of baseballs, the cover pieces are moistened or mulled so that the leather will more readily stretch and conform to the baseball core.

The bilobate clamp indicated generally by the reference numeral 40 is then brought into engagement with the outer surface of the cover piece preparatory to connecting the margin of the cover piece to the clamp. The clamp 40 is constructed of two similar rigid members identified by the reference numerals 46 and 48 (FIG. 17), the part 48 being the shorter of the two as will be explained. About the periphery of the two members 46 and 48 is a series of perforations 50 arranged to receive pins 44 inserted through the perforations 42 of the cover pieces 38.

The clamp 40 illustrated herein is intended to operate upon a baseball of Major League quality in which the cover perforations are located in exactly the same relationship with the dimensions of the cover parts as in baseballs manufactured by conventional methods. Each cover piece of a conventional Major League baseball has 104 perforations so positioned that two lie upon the longitudinal center line and two upon the transverse center line of each cover piece. The remainder of the perforations are so located that the threads joining the two cover pieces over a core cross at uniform distances along the abutting edges of the two cover pieces. The parts 46 and 48 of the clamp are connected by a spring hinge 52 (FIG. 9) having a narrow waist and forked ends and positioned at the bottom of a slot 54 having a figure eight configuration in the parts 46 and 48 of the clamp. The hinge 52 is secured to the parts 46, 48 by four rivets 58 inserted through each end of the hinge and into each of the parts 46, 48. The member 46 is made longer than the member 48 as shown in FIG. 17, so that the abutment of the parts lies between the cover perforation on the transverse center line of the cover piece and the adjacent cover perforations. By this expedient it is possible to maintain the same arrangement of perforations in baseballs manufactured in accordance with my method as in those manufactured by conventional processes and at the same time avoid difficulties which would arise if a pin 44 where inserted at the junction of the two parts. It will be readily appreciated, however, that by shifting the pattern of perforations slightly in the cover piece so that the longitudinal and transverse center lines lie between adjacent perforations, a minor change in the conventional baseball, it is possible to make the two parts of the clamp of equal length.

As may be seen in FIG. 8 the cover and clamp assembly machine is provided with devices for locating the clamp 40 over the form-supported cover piece. These devices include an outboard locator in the form of a key 60 arranged to engage the slot 54 at the waist of the clamp. In order that the lobes of the clamp may be readily positioned each is formed with a socket consisting of a cylindrical opening 62 intersected by a shallow slot 64 (FIG. 9). The cover and clamp assembly machine is provided with a pair of fingers or locators 66, one of which is shown in FIG. 8, for first engaging the slot 64 and then entering the cylindrical opening 62 as the clamp is seated over the cover piece 38. Each finger 66 is fixed upon the distal end of a short arm 68 fast upon a short vertical shaft 70 journaled in a bracket 72. At the lower end of each shaft 70 is fixed a second arm 74 generally parallel to but somewhat longer than the arm 68 and a tension spring 76 is stretched between the two arms 74 to urge the two locators 66 into engagement with the clamp 40. Rearwardly of the shaft 70 on each of the brackets 72 is an upstanding fixed pin 78 which limits the inward movement of its related locator 66 toward the axis of the studs 20, 26. Cooperating with the pin 78 for limiting the movement of the locator 66 is a lug 80 formed integral with the hub of the arm 68.

Referring more particularly to FIGS. 1 and 2, it will be seen that foot-actuated connections have been provided in the cover and clamp assembly machine for lowering the locating stud 26 and the nesting plate 22 into engagement with the form 10. The connections include a treadle 86 pivoted on a shaft 88 fixed in a pair of low floor-supported standards 90. The frame 36 of the machine is supported on a bench 92 and the treadle 86 extends inwardly beneath the bench. A vertical link 94, having a forked lower end, passes through a suitable opening in the bench and is connected to the inner end of the treadle 86 by means of a pin 96 through the lower end of the rod and a slot 98 cut in a block 100 upstanding on the upper surface of the treadle. Above the bench and surrounding the rod 94 is a spring 102 for urging the rod upwardly, the spring being compressed between the bench and a collar 104 fixed upon the rod. At its upper end the rod 94 is pivotally connected at 106 to the rearwardly extending arm 108 of an offset lever also formed with a forwardly extending arm 110. The offset lever 108, 110 is pivoted on a stud 112 fixed upon the frame 36, and the arm 110 is pivotally connected at its forward end to an intermediate vertical link 114 pivoted at its lower end to the carrier 24. It is thus seen that when the treadle 86 is rotated about the shaft 88 in a clockwise direction, as seen in FIG. 1, the carrier 24 is raised from the position shown in full lines to the position shown in dot-and-dash lines. This movement of the carrier is accompanied by a corresponding movement of the slide bar 34 which is provided with a pair of adjustably fixed collars 116, 118 for limiting the uppermost and lowermost positions respectively of the carrier 24. At its rear the carrier 24 is slotted to receive a stud 120 fixedly upstanding from the frame to prevent angular displacement of the carrier about the post. To prevent tipping of the carrier 24 in a vertical plane, the slide bar 34 is retained in widely separated guideways, one below the carrier and the other above between the stop collars 116 and 118.

The cover and clamp assembly machine is also provided with foot-actuated connections for bringing the clamp 40 into engagement with the form-supported cover piece. When the clamp 40 is presented to the machine, the operator depresses the inward end of a treadle 126 to cause the clamp to be engaged first by the key 60 which enters the slot 52 at the waist of the clamp and presses the clamp yieldingly into engagement with the cover piece and then by the locators 66 which enter the socket 62, 64, in the lobes of the clamp. The key 60 and the locators 66 not only retain the clamp in pressing engagement with the cover piece but also centralize the clamp to expose a generally uniform margin of the cover piece outside the periphery of the clamp. For these purposes the treadle 126 is connected by a pin 128 which passes through the forked lower end portion of a vertical link rod 130 and a slot 132 formed in a block 134 integral with the treadle. The rod 130 passes through a suitable opening in the bench 92 and is biased upwardly by a coil spring 135 acting between the bench and a collar 136 fast on the rod. The upper end of the rod is pivotally connected by a pin 138 to a horizontal arm 140 fixed upon a shaft 141 rotatable in the frame and also fixedly supporting a bell crank comprising a vertical arm 142. At its distal end the arm 142 is forked to receive a link 144 to which it is pivotally connected by a pin 146. The link 144 is pivoted at its rearward end to a yoke 150 interposed between a pair of horizontal slide rods 152 at the forward ends of which the brackets 72 are integrally formed. A stop screw 154 is adjustably locked by a check nut 156 on the arm 142 in position to engage an integral boss on the frame, thereby determining the most forward position of the yoke 150, and consequently of the locators 66.

Before the locators 66 enter the sockets 62, 64 in the lobes of the clamp, the key 60 engages the waist of the clamp for seating the clamp in encompassing relation with the cover piece. For this purpose a linkage is provided between the key 60 and a forwardly extending arm 158 which, with the arm 142, comprises the bell crank actuated by the treadle 126. The arm 158 is forked at its forward end and has passing through the forked portion a pin 160 free to turn in a slide block 162. A lever 164 (FIG. 4) pivoted on a shoulder screw 166 threaded in the frame is formed at its rearward end with a slot 168 which loosely embraces the block 162. The shoulder screw 166 also serves as a pivot for a second lever 170 and a spring 172 is compressed between integral tabs on the levers 164, 170. The spring 172 connects the levers so that when the lever 164 is moved by the operation of the treadle, in a clockwise direction as seen in FIG. 1, the lever 170 is also yieldingly urged in the same direction. Clockwise motion of the lever 170 is limited by an integral lug 174 extending inwardly from the pivot 166, which abuts a stop screw 176 adjustably locked in the frame. A pivotal connection 178 is provided between the outer end of the lever 170 and a carrier 180 at the outer end of which the key 60 is slidably supported. A torsion spring 182 is wrapped about the pivot 178 for urging the carrier to turn in a counterclockwise direction about the pivot and for holding a finger 184 integral with the carrier, in engagement with an eccentric stop pin 186 adjustably supported in the frame.

When the treadle 126 is depressed causing the shaft 141 to turn in a counterclockwise direction, the lever 164 is thereby moved from its solid line position toward its dot-dash line position shown in FIG. 1. The spring 172 couples the motion of the arm 164 to the lever 170 bringing the lug 174 into engagement with the stop screw 176 before the treadle 126 has been fully depressed. At this time, however, the key 60 is still essentially in the position shown in solid lines in FIG. 1 relatively to the carrier 180; that is, it is fully retracted in a slot in the carrier and accordingly is not immediately effective for seating the clamp 40 on the cover piece 38. Auxiliary mechanism is provided for seating the clamp about the cover piece 38, including an actuating lever 187 pivoted intermediate the ends of the carrier 180 and connected to the key 60 by a slot and block joint indicated at 188. As already indicated the key 60 is slidable in a slot in the carrier 180 and it is formed with an integral stem 189 which extends through the bottom wall of the slot in the carrier to the slot and block joint 188. For maintaining the key 60 in its normally retracted position, a spring 190 is compressed between the carrier 180 and the actuating lever 187. After the lug 174 has engaged the stop screw 176 the movement of the lever 170 is arrested but the lever 164 continues in motion to a limited extent as the treadle 126 is further depressed. During the continued movement of the lever 164 a cam surface 192 at the inner end of the actuating lever 187 is acted upon by a follower roll 194 rotatably supported on the forward end of the lever 164 to push the key 60 from its retracted position into engagement with the slot at the waist of the clamp so that the clamp is urged into intimate contact with the form-supported cover piece and the locators 66 having first engaged the slot 64 in the lobes of the clamp are now in position to enter the openings 62 thereby completing the orientation of the clamp and also being effective for holding the supporting form, cover and clamp in correct relative positions for further processing of the cover piece.

For the next operation to be performed on the cover piece the assembly consisting of the form 10, the cover piece 38 and the clamp 40 is removed from the machine by first operating the treadle 86 to raise the carrier 24 out of engagement with the form. Thereafter the arms 68 are manually spread apart to disengage the locators 66 from the openings 62 of the clamp and the treadle 126 is operated to return the locators and the key 60 to normally inactive positions shown in full lines in FIG. 1. By applying a small amount of manual pressure to the lobes of the clamp 40 the abrasive cloth sheathing 16 on the form 10 prevents relative displacement of the parts of the assembly. After removing the assembly from the first machine a spring clip such as that indicated at 196 in FIG. 17 may be employed for maintaining the relative positions of the parts of the assembly. With the slot 54 in the ends of the clamp 40 engaged by the legs of the clip 196 a set of pins 44 is then conveniently inserted through the cover perforations and into the perforations in the edge of the clamp. By connecting the margin of the cover piece in this manner to the edge of the clamp, a cover piece is placed completely under the control of the clamp for later application to a baseball core. It is possible to omit pins in alternate perforations and still retain the cover piece in the clamp but a pin in each perforation has been found preferable to place the cover entirely under the control of the clamp and to eliminate all cover stretching functions conventionally associated with the insertion of the thread.

After the pins have been inserted the ends of the clamp are spread apart either manually or by means of an expanding tool indicated generally at 198 in FIG. 16 and the form 10 is extracted leaving the cover piece connected by its edge to the clamp for further processing. The expanding tool 198 is also employed as will be explained for presenting two cover pieces to the second or cover stretching machine.

The expanding tool 198 comprises a pair of legs 204, 206, the latter one of which has a forked portion for receiving the leg 204 on a pivot 208. The leg 204 is longer than the leg 206 and includes an integral hook 210 formed to enter the slot 54 in the clamp. Between the hook 210 and the pivot 208 the leg 204 is also provided with a pair of guiding studs 212 slidable in the leg and urged inwardly by a leaf spring 214. Each of the guiding studs 212 is formed with an enlarged tapered head adapted to enter the slot 64 in the clamp 40 one on each side of the cylindrical opening 62, to guide a key 215 defined by the inner margin of the longer leg into the slot, to orient the clamp longitudinally in the expanding tool. In addition, a projection 216 is formed with a cylindrical surface on the leg 204 in position for freely entering the opening 62 of the clamp and a locator 218 integral with the longer leg also fits the slot 54 at the waist of the clamp. The leg 206 is shaped with an outwardly extending lug on which is pivoted at 220 a movable hook jaw 222 formed with an integral releasing arm 224 urged outwardly by a spring 226 compressed between the leg and the arm. Near the pivot 220 the leg 206 is provided with a single guiding stud 227 urged inwardly by a leaf spring 228 for entering the second slot 64 of the clamp in a manner similar to that described for the studs 212 to guide a key 229 defined by the margin of the leg into the slot. A projection 230 similar to that identified by the reference numeral 216 is also formed on the leg 206 to enter the related cylindrical opening 62. For urging the two legs 204, 206 into engagement with the clamp 40 a spring 232 is compressed within telescopically arranged closed end tubes 234, 236, each pivoted in a socket in one of the legs.

As has already been stated, the expanding tool 198 is employed for spreading apart the lobes of the clamp 40 so that the form 10 may be extracted. In addition, the expanding tool 198 is thereafter employed for spreading the lobes of the clamp still farther apart to apply a pair of cover pieces with their related clamps to a baseball core 240 (FIGS. 21 and 22), the cover pieces, clamp and baseball core being the component parts of what will hereafter be referred to as the sewing assembly. It will also be appreciated that at the time that the cover pieces are first applied to the core each cover piece is disposed in its related clamp as shown in FIG. 11, in transversely flat condition, that is, the cover piece bridges the distance between the edges of the lobes without conforming to the spherical internal surface of the clamp or to the outer surface of the core and the cover pieces are not relatively oriented in proper position for receiving a seam to connect them together nor are they fastened to the core to prevent displacement. Accordingly, the cover stretching machine to which the sewing assembly is thereafter introduced includes means for orienting each of the clamps 40 about the core 240 and for pressing the clamps onto the core so that the condition of the cover piece within the clamp is modified from the bridging relationship to a condition in which the outer surface of each cover piece engages substantially the entire inner surface of its related clamp as illustrated in FIG. 14. The process of changing the shape of each cover piece from the transversely flat condition to that in which it conforms to the core is referred to herein as spherifying and is accomplished in the cover stretching machine which will hereafter be described.

Figure 18:
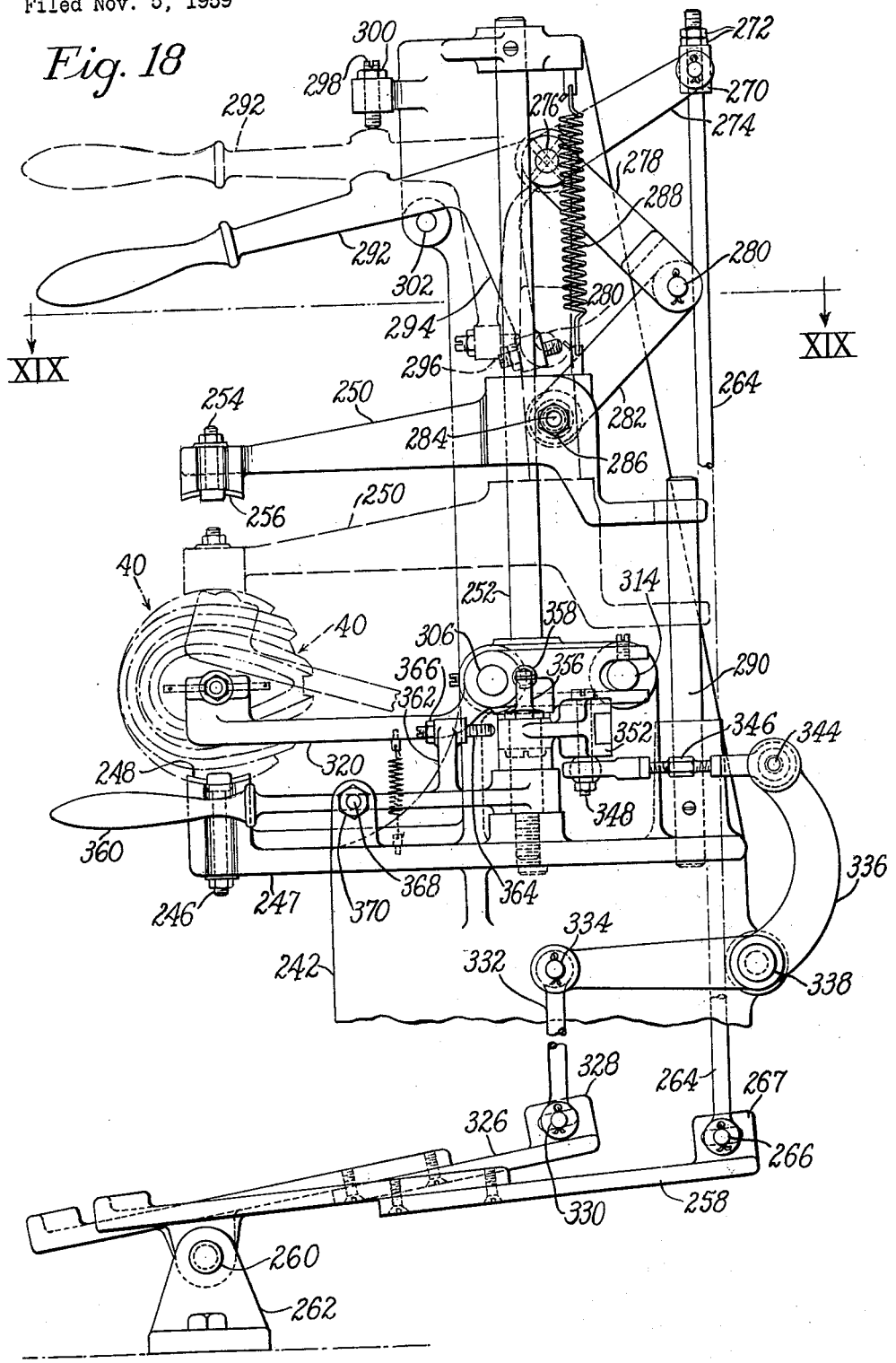
FIG. 18 is a view in right side elevation of a cover stretching machine employed in conjunction with apparatus according to the present invention.
Figure 19:
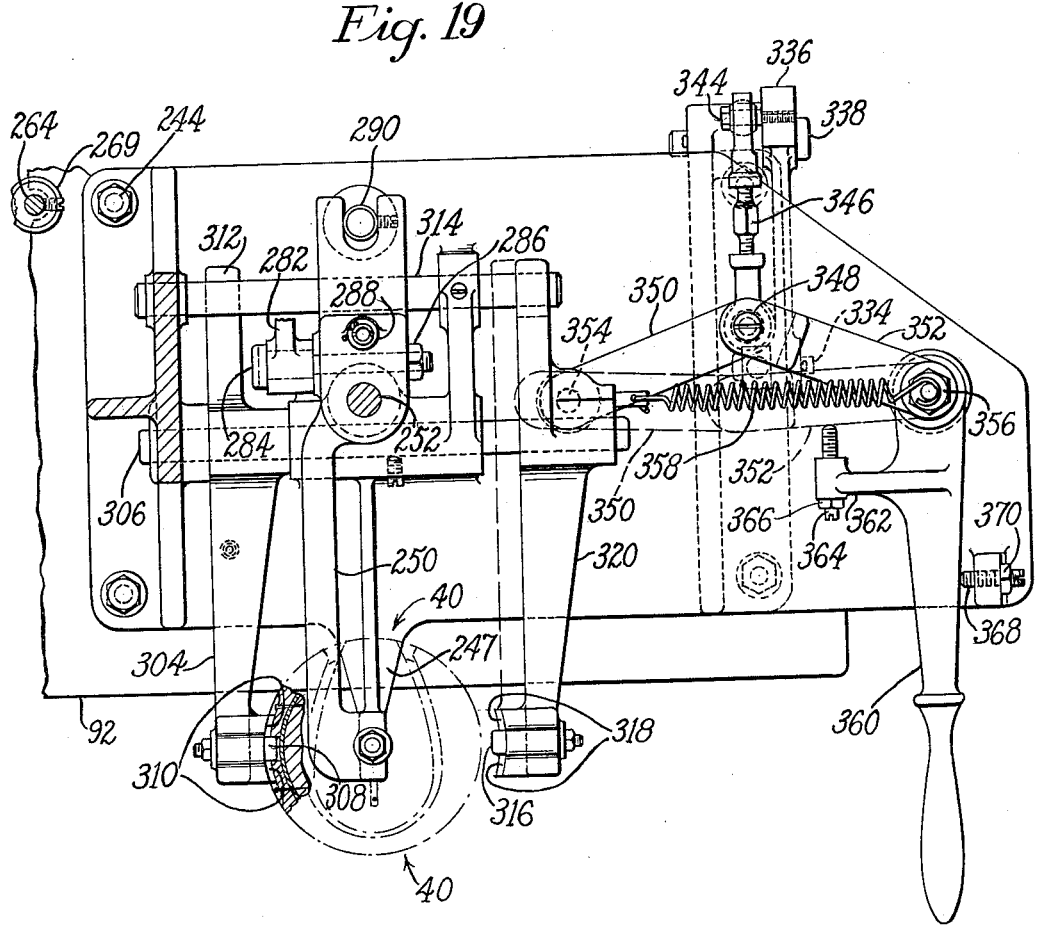
FIG. 19 is a plan view partially in cross section taken along the line XIX—XIX of FIG. 18.
Figure 20:
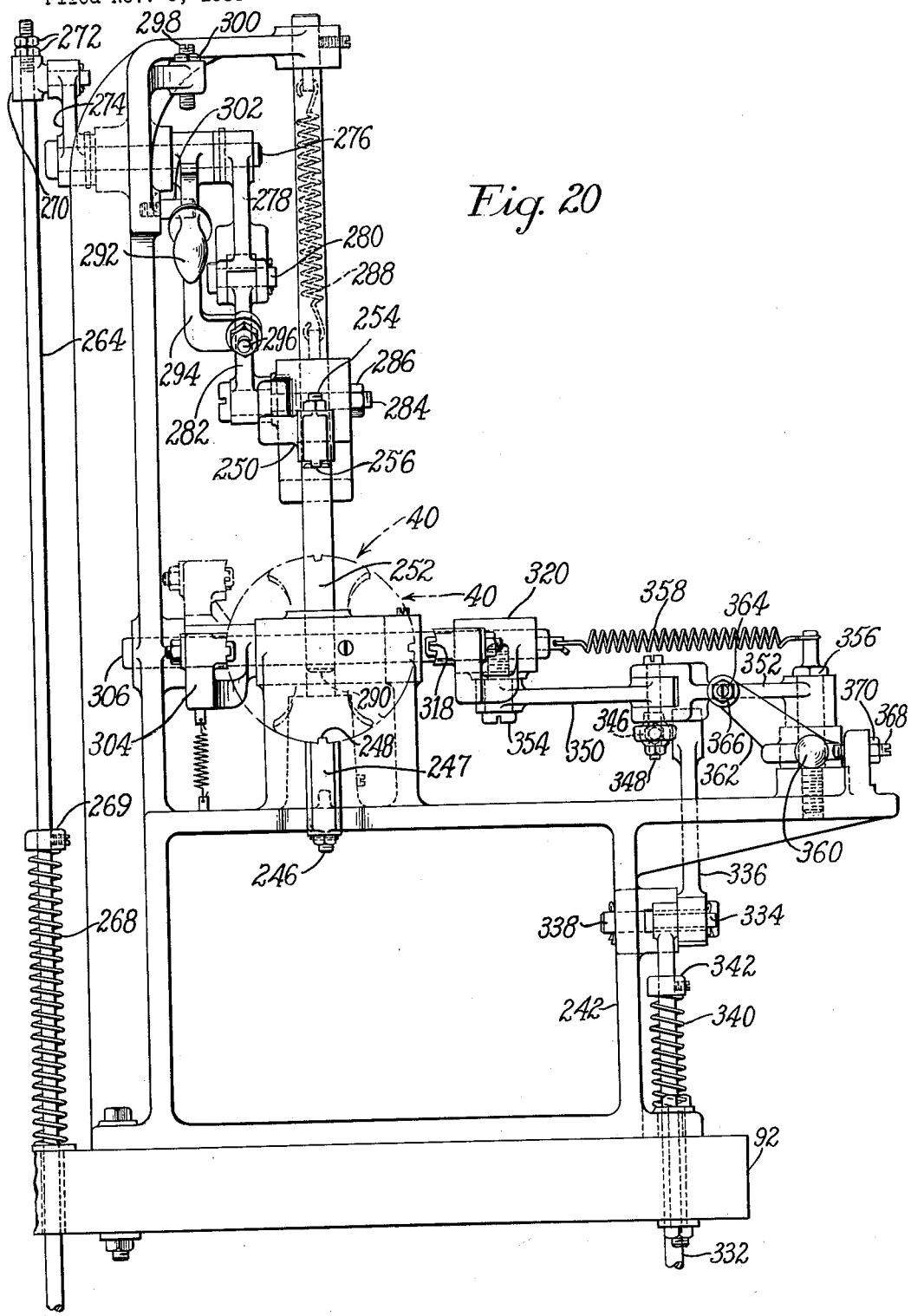
FIG. 20 is a view in front elevation of the machine illustrated in FIGS. 18 and 19.

For convenience the cover stretching machine, shown in FIGS. 18 to 20 inclusive, is mounted alongside the already-described assembly machine upon the bench 92 and includes a frame 242 secured by means of four bolts 244 to the top of the bench. For receiving one of the clamps of the sewing assembly and orienting its longitudinal center line in a vertical plane the cover stretching machine includes a locating stud 246 upstanding in a bracket 247 integral with and extending forwardly from the machine frame 242 and an arcuate key 248 extending fore and aft of the stud. The stud 246 is adapted to enter the cylindrical opening 62 and the key 248 engages the slot 64 in the lower lobe of the vertical clamp to orient the clamp in a predetermined vertical plane generally normal to the front edge of the bench 92. There is also provided in the cover stretching machine, locating means for engaging the upper lobe of the vertical clamp, comprising a horizontal offset carrier arm 250 mounted for vertical sliding movement on a guide post 252 rigidly supported in the frame. At its forward end the arm 250 carries a guide stud 254 and an arcuate key 256 capable of being moved into engagement with the socket in the upper lobe of the vertical clamp 40.

Movement is imparted to the arm 250 by foot actuated connections including a treadle 258 pivoted on a shaft 260 supported in a pair of floor mounted standards 262. Beneath the bench 92 the treadle 258 is connected to a vertical link rod 264 by means of a pin 266 which passes through the lower end of the rod and through a slot formed in an integral upstanding projection 267 on the treadle and the link rod is urged upwardly by a spring 268 compressed between a collar 269 (FIG. 20) fixed upon the rod and the bench 92. The upper end of the rod 264 has loosely fitted to it an adapter 270 backed by a pair of check nuts 272 and pivotally connected to an arm 274 secured to a shaft 276 upon which another arm 278 is also secured. The arm 278 is pivoted at 280 to a link 282, which link, together with the arm 278, comprises a toggle for raising and lowering the carrier arm 250. A shoulder screw 284 retained by a nut 286 connects the other end of the link to the carrier arm 250 and the carrier arm is normally maintained in its inactive position shown in solid lines in FIG. 18 by a tension spring 288 stretched between the carrier arm and an upper portion of the frame 242. In order to prevent rotation of the arm 250 in a horizontal plane about the post 252 a second short post 290 is fixedly supported in upstanding position at the rear of the base 242 and is embraced by a rearwardly extending forked portion of the carrier arm.

When the treadle 258 is actuated to lower the rod 264 the arm 278 and the link 282 are moved toward and through a position of alinement to a locked position of slight misalinement while bringing the stud 254 and the key 256 into engagement with the socket in the upper lobe of the vertical clamp. An unlocking lever 292 is fulcrumed on the shaft 276 and provided with a depending arm 294 into the lower end of which is threaded a limit screw 296 engageable by the link 282 at a point near the pivot 280 to arrest the movement of the toggle in locked position. Movement of the lever 292 when the screw 296 is engaged by the toggle is limited by a stop screw 298 threaded in a forwardly extending ear near the top of the frame and locked by a nut 300. To limit the counterclockwise movement of the lever 292 when it is actuated to break the toggle to allow the carrier arm 250 to be raised by the spring 288, the underside of the lever is engaged by a stop finger 302 extending horizontally from the frame.

Similar devices have been incorporated in the cover stretching machine for operating upon the horizontal cover piece and its clamp, that is the clamp and cover piece having their longitudinal center line disposed in a horizontal plane. In order to facilitate the presentation of the sewing assembly to the cover stretching machine the horizontal clamp is first engaged by a locator to permit the stud 246 and the key 248 to be approached by the vertical clamp in a downward direction from above. For this purpose there is provided a locator supporting arm 304 mounted for pivotal movement in a vertical plane about a horizontal shaft 306 fixedly retained in the frame. At its forward end the arm 304 carries a locating stud 308 like those indicated by the reference numerals 246, 254 and an arcuate key 310 formed like those designated as 248 and 256. To position the horizontal cover piece correctly with respect to the vertical cover piece, the arm 304 is provided with an integral rearwardly extending finger 312 which underlies a guide rod 314 fixedly supported in the frame in generally parallel relationship with the shaft 306. Because of the mounting of the arm 304 the horizontal clamp may first be engaged by the stud 308 and the key 310 and then the lower socket of the vertical clamp is brought into engagement with the stud 246 and the key 248. The treadle 258 is then actuated to lower the arm 250 causing the upper socket of the vertical clamp to be engaged to spherify the vertical cover piece and securely grip the core 240. Thereafter the remaining lobe of the horizontal clamp is pressed inwardly to spherify the horizontal cover piece and the two cover pieces are maintained temporarily in their already-established relationship so that a conventional seam is inserted by a hand-sewer employing a minimum degree of skill.

For the purpose of engaging the remaining socket of the horizontal clamp 40, there is provided a locating stud 316 and an arcuate key 318 on a toggle actuated carrier arm 320 slidable horizontally on the shaft 306. To prevent the arm 320 from rotating about the shaft 306 it has a forked rearwardly extending portion which embraces the rod 314. Actuation of the arm 320 is by means of a treadle 326 formed at its inner end with an integral upstanding slotted block 328 through the slot of which a pin 330 passes to connect the treadle to the lower end of a vertical link rod 332. At its upper end the rod 332 is pivotally connected at 334 to the forward end of a horizontally disposed arm of a bell crank 36 pivotally mounted on a stud 338 supported at the rear of the frame 242. The rod 332 is urged upwardly, as seen in FIG. 20, by a spring 340 wrapped around it and compressed between the machine frame and a collar 342 fixed upon the rod. For imparting the movement of the rod 332 to the arm 320 the bell crank 336 has a vertical arm pivotally connected at 344 to a short horizontal link 346 having its other end pivoted to the central joint 348 of a toggle comprising links 350 and 352. The toggle 350, 352 is movable in a horizontal plane, the link 350 having its outer end pivotally connected at 354 on the carrier arm 320. The outer end of the link 352 is free to pivot on a shoulder screw 356 threaded into the frame and a spring 358 is stretched between the carrier arm 320 and the shoulder screw to resist movement of the toggle links into positions of alinement.

For the purpose of limiting the movement of the toggle links 350, 352 and for breaking the toggle to return the arm 320 to its inactive position shown in full lines in FIG. 19, there is also pivoted on the shoulder screw 356 below the link 352 a lever 360 having an arm 362 into which is threaded a set screw 364 adjustably locked by a check nut 366. When the screw 364 is engaged by the link 352 the movement of the lever 360 is limited by a stop screw 368 threaded in the frame and locked by a check nut 370. The screws 364 and 368 are adjusted to arrest the movement of the toggle links after they have passed through the position of alinement and are in positions of limited misalinement, in which misalined positions, shown in dot and dash lines, in FIG. 19, the toggle is locked until the lever 360 is operated to break the toggle and thereby release the horizontal clamp 40. As has already been explained for the vertical cover piece and clamp, the pressure applied to the horizontal clamp by the carrier arm 320 causes the horizontal cover piece to be spherified, and in addition locates the horizontal cover piece in the necessary seam-receiving relationship with the vertical cover piece.

After both cover pieces have been spherified and before the sewing assembly is removed from the cover stretching machine it is necessary that the clamps 40 be secured to the core 240 so that the cover pieces will be maintained in seam receiving relationship until a conventional baseball seam is inserted. Fastening of the clamps 40 to the core 240 is accomplished, as is seen in FIGS. 21 and 22, by brads 372 two such brads being inserted through each lobe of each clamp. To receive the brads 372 each lobe is formed with a pair of perforations 374 extending from the bottom of the slot 64 to the interior of the clamp and the brads are inserted through these perforations, then through the related cover piece and into the core 240. The diameter of the brads 372, exaggerated in the drawings, for purposes of clarity, is such that the puncture in the cover pieces is not a serious disadvantage which in any event is either substantially reduced or eliminated all together by rolling the baseball, a conventional step for embedding the seam partly in the cover piece after the seam has been inserted.

Upon being removed from the cover stretching machine the sewing assembly is ready for the sewing operation. At this time not only are the clamps 40 secured in proper relationship on the core by the brads 372 but the cover pieces also adhere to the core 240 which, according to the usual practice in baseball manufacture, has been coated with cement before the cover pieces are applied. The seam adjoining the margins of the two cover pieces is of conventional form, being inserted with a pair of double cotton threads indicated at 284 in FIGS. 13 to 15, inclusive. Curved needles 386 are threaded in the usual manner for passing the two double threads through the cover perforations 42. However, as already been indicated, the threads 384 are not employed to stretch the cover pieces over the core since this has already been accomplished under the control of the clamps 40 in the cover stretching machine. As the seam progresses the pins 44 are pushed back out of engagement with the cover perforations 42 and partway into the slot 54 with which the perforations 50 of the clamp are in communication. Since the pushing back of the pins 44 may conveniently be accomplished with the point of the needle as it enters the cover perforations 42 it will be appreciated that the contour of each cover piece is either under the control of the thread or of the pins 44.

In the conventional baseball cover sewing the position of the line of abutment between the two cover pieces and consequently of the seam varies in accordance with the stretch characteristics of the leather and the pull applied to the threads by the sewer. In order to achieve an acceptable degree of uniformity by the conventional sewing method a high order of judgment and experience is accordingly required on the part of the sewer. In addition, the balancing of the pull on the two threads being inserted so as to achieve the required degree of uniformity greatly reduces the effective sewing speed. By contrast, when baseball cover pieces are sewn together by employing a pair of clamps, the threads need be pulled only sufficiently to bring the edges of the cover pieces into abutting relationship, and since the line of abutment is determined by rigid clamps the possibility of introducing irregularities in the position of the seam are substantially eliminated and a higher sewing speed than heretofore attainable may readily be achieved.

For the purpose of presenting the ball at a convenient level for the sewer and to permit the use of both hands for inserting the seam it has been found convenient to employ a vise of somewhat conventional design such as that shown in FIG. 15 and comprising a fixed jaw 388, supported on a bench 390. A movable jaw 392 is pivoted at 394 on the fixed jaw and connected to a treadle 396. By depressing the treadle 396 the jaws are spread so that a sewing assembly may be received, reoriented or removed from the vise. The treadle 396 is pivoted at its rearward end on a shaft 398 supported in a floor-mounted standard 400 and is pivotally connected at 402 to a vertical link rod 404. At its upper end the rod 404 is forked to receive a lateral projection 406 on the movable jaw 392 and a pin 408 passes loosely through the rod and the projection. For urging the two jaws into gripping relationship with the sewing assembly a spring 410 is stretched between them. To prevent escape of the sewing assembly by depressing the treadle too far a spring-pressed bumper 412 is mounted on the treadle and resists excess movement of the treadle when the jaws have been sufficiently opened to permit the sewing assembly to be reoriented as the insertion of the seam continues.

From the foregoing it will be seen that I have provided a novel apparatus for preparing cover pieces to be applied to baseballs but it will also be realized that with slight modifications in size, the apparatus already described can readily be applied, for example, to the manufacture of softballs. Further modifications and the value of various parts of the present disclosure will readily be apparent to those skilled in the art. It is accordingly not intended to confine the invention to the precise form herein shown, but rather to limit it in terms of the appended claims.

Having thus described my invention what I claim as new and desire to secure by Letters Patent of the United States is:

1. Apparatus for operating upon an elongated bilobate cover piece having a sewing margin preparatory to spherifying the cover piece on a ball core, comprising a form having a cover piece engaging surface similar in outline to the cover piece when the cover piece is arched longitudinally, a support for the form, locating means for receiving the arched cover piece in correspondence with and over the supported form, and an articulated clamp having a cover-engaging ridge adapted to engage the cover piece inside the margin.

2. Apparatus for operating upon an elongated bilobate cover piece having a sewing margin preparatory to spherifying the cover piece on a ball core, comprising a form having a cover piece engaging surface similar in outline to the cover piece when the cover piece is arched longitudinally, a support for the form, locating means for receiving the arched cover piece in correspondence with and over the supported form, an articulated clamp having a cover-engaging ridge adapted to engage the cover piece inside the margin, and means for securing the margin of the cover piece to the clamp.

3. Apparatus for operating upon an elongated bilobate cover piece having a sewing margin preparatory to spherifying the cover piece on a ball core, comprising a form of yielding material having a slip-resistant cover piece engaging surface similar in outline to the cover piece when the cover piece is arched longitudinally, a fixed lower support for the form, clamping means for retaining the form on the lower support, locating means for receiving the arched cover piece in correspondence with and over the supported form, and an articulated clamp having a cover-engaging ridge adapted to engage the cover piece inside the margin.

4. A machine for orienting a bilobate ball cover piece having a sewing margin over an arch form and within a bilobate clamp of smaller dimensions than the cover piece, comprising a frame, releasable holding means on the frame for the form, gage means for locating the cover piece relatively to the form and orienting means for guiding the clamp into embracing relationship over the form-supported cover piece.

5. A machine for orienting a bilobate ball cover piece having a sewing margin over an arch form and within a bilobate clamp of smaller dimensions than the cover piece, comprising a frame, a support on the frame for the form, clamping means for retaining the form on the support, gage means for locating the cover piece relatively to the form and orienting means for guiding the clamp into embracing relationship over the form-supported cover piece.

6. A machine for orienting a bilobate ball cover piece having a sewing margin over a form including a tubular member and a cover piece engaging surface arcuately disposed in parallel relationship with the axis of the tubular member, comprising a frame, means for orienting the form on the frame including a stud adapted to be received within the tubular member, movable means for clamping the form over the stud and gage means on the frame for locating the cover piece relatively to the form.

7. A machine for orienting a bilobate ball cover piece having a sewing margin over a form including a tubular member and a cover piece engaging surface arcuately disposed in parallel relationship with the axis of the tubular member, comprising a frame, means for orienting the form on the frame including a stud adapted to be received within the tubular member, movable means for clamping the form over the stud, gage means on the frame for locating the cover piece relatively to the form, and orienting means for guiding the clamping means into embracing relationship over the form-supported cover piece.

8. Apparatus for preparing for spherification, an elongated bilobate ball cover piece having a sewing margin, comprising a form having a cover piece engaging surface similar to that of the cover piece but of smaller dimensions, an articulated clamp having a contour similar to that of the cover piece and also of smaller dimensions than the cover piece whereby the margin of the cover piece sandwiched between the form and the clamp is exposed, and means for securing the margin to the clamp.

9. Apparatus for preparing for spherification, an elongated bilobate ball cover piece having a sewing margin comprising a form of yielding material having a cover piece engaging surface similar to that of the cover piece but of smaller dimensions, an internally spherical clamp having an angular edge surface intersecting the inner sphere, the intersection defining a ridge for frictionally engaging the cover piece while the latter is supported on the form, and means for securing the margin to the clamp while the cover piece is frictionally engaged.

10. Apparatus for preparing for spherification, an elongated bilobate ball cover piece having a sewing margin comprising a form of yielding material having a work surface similar to that of the cover piece but of smaller dimensions, a frictional sheathing on the working surface, an internally spherical clamp having an angular edge surface intersecting the inner sphere, the intersection defining a ridge for frictionally engaging the cover piece while the latter is supported on the form, and means for securing the margin to the clamp while the cover piece is frictionally engaged.

11. Apparatus for preparing for spherification, an elongated bilobate ball cover piece having a regularly perforated sewing margin comprising a form having a cover piece engaging surface similar to that of the cover piece but of smaller dimensions, an internally spherical clamp having a contour similar to that of the cover piece and also of smaller dimensions than the cover piece whereby the margin of the cover piece, sandwiched between the form and the clamp, is exposed, and means for securing the margin to the clamp including a series of openings in the contour of the clamp registerable with the perforations in the cover piece and pins extending through the perforations and into the openings.

References Cited in the file of this patent

UNITED STATES PATENTS

| | | |
|---|---|---|
| 140,645 | Richardson | July 8, 1873 |
| 238,446 | Shaffer | Mar. 1, 1881 |
| 464,093 | Cartwright et al. | Dec. 1, 1891 |
| 848,007 | Brusseau | Mar. 26, 1907 |
| 1,167,265 | Brusseau | Jan. 4, 1916 |
| 1,229,277 | Johannesen | June 12, 1917 |
| 1,542,550 | Grunow et al. | June 16, 1925 |
| 1,691,671 | Riddell | Nov. 13, 1928 |
| 1,923,359 | Fegan | Aug. 22, 1933 |
| 2,378,336 | Sopp | June 12, 1945 |
| 2,616,281 | Calhoun | Nov. 4, 1952 |
| 2,747,529 | Haas | May 29, 1956 |
| 2,800,866 | Grever | July 30, 1957 |